(12) United States Patent
Huff

(10) Patent No.: US 10,870,337 B2
(45) Date of Patent: Dec. 22, 2020

(54) THIN VISOR

(71) Applicant: IRVIN AUTOMOTIVE PRODUCTS, LLC, Pontiac, MI (US)

(72) Inventor: David Huff, Waterford, MI (US)

(73) Assignee: Irvin Automotive Products, LLC, Pontiac, MI (US)

(*) Notice: Subject to any disclaimer, the term of this patent is extended or adjusted under 35 U.S.C. 154(b) by 114 days.

(21) Appl. No.: 16/288,612

(22) Filed: Feb. 28, 2019

(65) Prior Publication Data
US 2020/0276888 A1 Sep. 3, 2020

(51) Int. Cl.
- *B60J 3/00* (2006.01)
- *B60J 3/02* (2006.01)
- *B60Q 3/252* (2017.01)
- *B60R 16/03* (2006.01)

(52) U.S. Cl.
CPC ............ *B60J 3/0282* (2013.01); *B60J 3/0213* (2013.01); *B60Q 3/252* (2017.02); *B60R 16/03* (2013.01)

(58) Field of Classification Search
CPC ...... B60J 3/0282; B60J 3/0278; B60J 3/0208; B60J 3/0204; B60Q 3/252
See application file for complete search history.

(56) References Cited

U.S. PATENT DOCUMENTS

| | | |
|---|---|---|
| 3,710,674 A | 1/1973 | Tabor |
| 3,926,470 A | 12/1975 | Marcus |
| 4,000,404 A * | 12/1976 | Marcus ................ B60J 3/0282 362/135 |
| 4,075,468 A * | 2/1978 | Marcus ................ B60J 3/0282 296/97.5 |
| 4,174,864 A * | 11/1979 | Viertel ................. B60J 3/0282 296/97.5 |
| 4,227,241 A | 10/1980 | Marcus |
| 4,479,172 A | 10/1984 | Connor |
| 4,491,899 A * | 1/1985 | Fleming ............... B60J 3/0282 296/97.5 |
| 4,521,046 A | 6/1985 | Foggini |
| 4,533,275 A | 8/1985 | Foggini |
| 4,598,943 A | 7/1986 | Scholz et al. |
| 4,617,699 A | 10/1986 | Nakamura |
| 4,648,011 A * | 3/1987 | Boote ................... B60J 3/0282 296/97.5 |

(Continued)

FOREIGN PATENT DOCUMENTS

| JP | 10151944 | 6/1998 |
|---|---|---|
| JP | 2001322428 | 11/2001 |

(Continued)

*Primary Examiner* — Kiran B Patel
(74) *Attorney, Agent, or Firm* — Raggio & Dinnin, P.C.

(57) ABSTRACT

A thin visor for a vehicle comprising a pivot rod and a first and second shell being engageable to form a visor body. The visor also comprises a vanity secured to the visor body. The visor comprises a carrier positioned in the visor body and engaged with the pivot rod. The visor also comprises a first electrical contact arranged on an end of the pivot rod and a second electrical contact arranged on a surface of the carrier. The visor further comprises a third electrical contact arranged on a surface of the carrier. The thin visor generally has a width of approximately seventeen to eighteen millimeters and allows for a sleek small profile ergonomically designed visor to be arranged within a vehicle.

20 Claims, 7 Drawing Sheets

(56) References Cited

U.S. PATENT DOCUMENTS

| | | | | |
|---|---|---|---|---|
| 4,652,982 A * | 3/1987 | Flowerday | B60Q 3/252 | 296/97.5 |
| 4,679,843 A | 7/1987 | Spykerman | | |
| 4,710,856 A * | 12/1987 | Cheung | B60Q 3/252 | 296/97.5 |
| 4,715,644 A | 12/1987 | Lobanoff et al. | | |
| 4,729,590 A | 3/1988 | Adams | | |
| 4,744,645 A * | 5/1988 | Sharp | B60J 3/0282 | 296/97.5 |
| 4,751,618 A * | 6/1988 | Iacovelli | B60J 3/0282 | 200/61.52 |
| 4,756,570 A | 7/1988 | Cooper | | |
| 4,760,503 A * | 7/1988 | VandenBerge | B60J 3/0282 | 362/135 |
| 4,764,852 A * | 8/1988 | Sakuma | B60J 3/0282 | 362/135 |
| 4,847,737 A * | 7/1989 | Van Order | B60J 3/0282 | 362/137 |
| 4,878,158 A * | 10/1989 | Svensson | B60J 3/0282 | 362/140 |
| 4,879,637 A * | 11/1989 | Clark | F21V 23/02 | 362/141 |
| 4,925,233 A | 5/1990 | Clark | | |
| 4,973,020 A | 11/1990 | Canadas | | |
| 4,993,772 A | 2/1991 | Charen | | |
| 4,997,228 A | 3/1991 | Kempkers | | |
| 4,998,765 A | 3/1991 | Van Onder et al. | | |
| 4,999,599 A * | 3/1991 | Spier | H01H 36/00 | 335/205 |
| 5,011,211 A | 4/1991 | Svensson | | |
| 5,022,699 A * | 6/1991 | Yoshida | B60J 3/0282 | 296/97.5 |
| 5,054,839 A * | 10/1991 | White | B60J 3/0278 | 296/97.1 |
| 5,059,016 A | 10/1991 | Lawassani | | |
| 5,078,445 A * | 1/1992 | VandenBerge | B60J 3/0282 | 16/227 |
| 5,082,322 A | 1/1992 | Cekander et al. | | |
| 5,143,678 A * | 9/1992 | Prillard | B29C 45/1671 | 264/255 |
| 5,161,850 A | 11/1992 | Reeder et al. | | |
| 5,184,867 A | 2/1993 | Prillard | | |
| 5,188,446 A * | 2/1993 | Miller | B60J 3/0282 | 296/97.5 |
| 5,205,635 A * | 4/1993 | Van Order | B60R 11/02 | 362/135 |
| 5,230,546 A | 7/1993 | Smith | | |
| 5,232,192 A | 8/1993 | Akutagawa | | |
| 5,267,090 A * | 11/1993 | Dowd | B60J 3/0282 | 296/97.5 |
| 5,329,430 A * | 7/1994 | Lanser | B60J 3/0282 | 362/144 |
| 5,331,518 A * | 7/1994 | Roark | B60J 3/0208 | 362/144 |
| 5,340,186 A | 8/1994 | Aymerich | | |
| 5,409,285 A * | 4/1995 | Snyder | B60J 3/0239 | 248/279.1 |
| 5,428,513 A * | 6/1995 | Hiemstra | B60J 3/0282 | 296/97.5 |
| 5,445,427 A | 8/1995 | Vandagriff | | |
| 5,486,033 A | 1/1996 | Lecorvaisier | | |
| 5,533,776 A * | 7/1996 | Agro | B60J 3/0282 | 296/97.12 |
| 5,544,928 A | 8/1996 | Mori et al. | | |
| 5,553,907 A * | 9/1996 | Finn | B60J 3/0278 | 296/97.1 |
| 5,556,154 A | 9/1996 | Vaxelaire | | |
| 5,560,704 A | 10/1996 | Hiemstra et al. | | |
| 5,575,552 A | 11/1996 | Faloon | | |
| 5,580,117 A | 12/1996 | Goclowski | | |
| 5,580,118 A | 12/1996 | Crotty, III | | |
| 5,645,308 A | 7/1997 | Fink | | |
| 5,653,490 A | 8/1997 | Fink et al. | | |
| 5,653,496 A | 8/1997 | Mori et al. | | |
| 5,660,424 A | 8/1997 | Aymerich et al. | | |
| 5,685,629 A | 11/1997 | Hemmeke et al. | | |
| 5,820,197 A | 10/1998 | Lanser | | |
| 5,823,603 A | 10/1998 | Crotty, III | | |
| 5,855,443 A | 1/1999 | Faller et al. | | |
| 5,951,091 A | 9/1999 | VanderKuyl et al. | | |
| 5,967,587 A | 10/1999 | Collet et al. | | |
| 5,967,588 A | 10/1999 | Collet et al. | | |
| 6,010,174 A | 1/2000 | Murdock et al. | | |
| 6,010,175 A | 1/2000 | Bodar et al. | | |
| 6,012,757 A | 1/2000 | Viertel et al. | | |
| 6,024,399 A | 2/2000 | Viertel et al. | | |
| 6,059,348 A | 5/2000 | Viertel et al. | | |
| 6,076,947 A * | 6/2000 | Miller | B60J 3/0282 | 338/183 |
| 6,131,985 A * | 10/2000 | Twietmeyer | B60J 3/0239 | 296/97.1 |
| 6,135,610 A | 10/2000 | Beck et al. | | |
| 6,139,083 A * | 10/2000 | Fischer | B60J 3/0239 | 296/97.11 |
| 6,174,019 B1 | 1/2001 | Collet et al. | | |
| 6,189,949 B1 | 2/2001 | Miller et al. | | |
| 6,220,644 B1 | 4/2001 | Tiesler et al. | | |
| 6,264,264 B1 | 7/2001 | Kato et al. | | |
| 6,264,352 B1 | 7/2001 | Zapinski | | |
| 6,325,443 B1 | 12/2001 | Sanchez | | |
| 6,334,626 B2 | 1/2002 | Nakajima et al. | | |
| 6,368,114 B1 | 4/2002 | Inoue | | |
| 6,371,546 B1 | 4/2002 | Jefferson | | |
| 6,382,697 B1 | 5/2002 | Mulder et al. | | |
| 6,428,193 B1 * | 8/2002 | Guyot | B60J 3/0204 | 296/97.5 |
| 6,435,593 B2 | 8/2002 | Welter | | |
| 6,439,638 B1 | 8/2002 | Kawasaki et al. | | |
| 6,464,381 B2 | 10/2002 | Anderson, Jr. et al. | | |
| 6,474,717 B2 | 11/2002 | Viertel et al. | | |
| 6,475,937 B1 | 11/2002 | Preisler et al. | | |
| 6,494,521 B2 | 12/2002 | Hennessey | | |
| 6,499,868 B2 | 12/2002 | Kerul | | |
| 6,511,029 B2 | 1/2003 | Sawayanagi | | |
| 6,547,308 B2 | 4/2003 | Hamelink et al. | | |
| 6,604,772 B2 | 8/2003 | Sturt | | |
| 6,604,773 B2 | 8/2003 | Aoki et al. | | |
| 6,612,637 B1 | 9/2003 | Crotty | | |
| 6,637,799 B1 | 10/2003 | Tiesler | | |
| 6,659,528 B1 | 12/2003 | Wilson | | |
| 6,669,859 B1 | 12/2003 | Tiesler | | |
| 6,676,129 B2 | 1/2004 | Wilson | | |
| 6,679,538 B1 | 1/2004 | Sturt | | |
| 6,685,257 B1 | 2/2004 | Beland et al. | | |
| 6,692,059 B1 | 2/2004 | Mills | | |
| 6,692,060 B1 | 2/2004 | Wilson | | |
| 6,698,814 B1 | 3/2004 | Mills et al. | | |
| 6,698,815 B1 | 3/2004 | Mills | | |
| 6,707,674 B1 | 3/2004 | Bryant et al. | | |
| 6,796,593 B2 | 9/2004 | Hennessey | | |
| 6,799,795 B1 | 10/2004 | Zapinski | | |
| 6,830,280 B2 | 12/2004 | Sturt et al. | | |
| 6,840,561 B2 | 1/2005 | Mills et al. | | |
| 6,860,546 B1 | 3/2005 | Fero et al. | | |
| 6,863,332 B2 | 3/2005 | Yasuhara et al. | | |
| 6,871,990 B2 | 3/2005 | Imazeki et al. | | |
| 6,910,725 B1 | 6/2005 | Lanser et al. | | |
| 6,921,121 B2 | 7/2005 | Schneider et al. | | |
| 6,923,490 B2 | 8/2005 | Peterson et al. | | |
| 6,948,736 B2 | 9/2005 | DePottey et al. | | |
| 6,957,841 B1 | 10/2005 | Tiesler et al. | | |
| 6,962,385 B2 | 11/2005 | Wieczorek et al. | | |
| 7,000,972 B2 | 2/2006 | Asai | | |
| 7,025,399 B1 | 4/2006 | Crotty, III | | |
| 7,032,949 B1 * | 4/2006 | Wang | B60J 3/0239 | 296/97.5 |
| 7,036,877 B2 | 5/2006 | Schultz et al. | | |
| 7,036,965 B2 | 5/2006 | Dalton, Jr. et al. | | |
| 7,055,884 B2 | 6/2006 | Zapinski et al. | | |
| 7,059,652 B2 | 6/2006 | Aoki et al. | | |
| 7,086,681 B2 | 8/2006 | Fernandez et al. | | |
| 7,090,281 B2 | 8/2006 | Davey et al. | | |

(56) References Cited

U.S. PATENT DOCUMENTS

| | | |
|---|---|---|
| 7,108,308 B2 | 9/2006 | Remy |
| RE39,316 E | 10/2006 | Murdock et al. |
| 7,201,427 B2 | 4/2007 | Wang et al. |
| 7,213,865 B2 | 5/2007 | Torri |
| 7,217,017 B2 | 5/2007 | Smith |
| 7,281,751 B2 | 10/2007 | Hamelink et al. |
| 7,311,427 B2 | 12/2007 | Barker et al. |
| 7,320,493 B2 | 1/2008 | Kumakawa et al. |
| 7,338,108 B2 | 3/2008 | Iwatsuka et al. |
| 7,384,088 B2 | 6/2008 | Remy |
| 7,416,239 B2 | 8/2008 | Lanser et al. |
| 7,416,319 B2 | 8/2008 | Richard et al. |
| 7,458,627 B2 | 12/2008 | Tiesler et al. |
| 7,461,886 B1 * | 12/2008 | Wang ................. B60J 3/0239 |
| | | 296/97.1 |
| 7,534,018 B2 | 5/2009 | Nicola |
| 7,537,263 B2 | 5/2009 | Delphia |
| 7,556,308 B2 | 7/2009 | Lee et al. |
| 7,559,667 B2 | 7/2009 | Holderman |
| 7,677,775 B2 | 3/2010 | Oehmann |
| 7,703,832 B2 | 4/2010 | Shorter et al. |
| 7,717,491 B2 | 5/2010 | Beck et al. |
| 7,780,322 B2 | 8/2010 | Muller et al. |
| 7,784,847 B2 | 8/2010 | Asai |
| 7,798,551 B2 | 9/2010 | Okazaki et al. |
| 7,771,062 B2 | 10/2010 | Kuhn |
| 7,823,954 B2 | 11/2010 | Jones et al. |
| 7,854,464 B2 | 12/2010 | Mori |
| 7,862,220 B2 | 1/2011 | Cannon et al. |
| 7,866,724 B2 | 1/2011 | Olep et al. |
| 7,944,371 B2 | 5/2011 | Foote |
| D643,951 S | 8/2011 | Cal |
| 8,096,688 B2 | 1/2012 | Kino et al. |
| 8,215,810 B2 | 7/2012 | Welch et al. |
| 8,333,422 B2 | 12/2012 | Ogawa et al. |
| 8,408,773 B2 | 4/2013 | Judge |
| 8,425,094 B2 | 4/2013 | Stakoe |
| 8,434,811 B2 | 5/2013 | Rockafellow et al. |
| 8,596,803 B2 | 12/2013 | Schultz |
| 8,606,355 B1 | 12/2013 | Bruhnke et al. |
| 8,845,000 B2 | 9/2014 | Asai et al. |
| 8,905,457 B2 | 12/2014 | Mertz |
| 9,033,392 B2 | 5/2015 | Asai et al. |
| 9,186,962 B2 | 11/2015 | Huff et al. |
| 9,233,598 B1 | 1/2016 | Elwood |
| 9,352,638 B2 | 5/2016 | Barna |
| 9,434,241 B2 | 9/2016 | Asai et al. |
| 9,481,230 B2 | 11/2016 | Marco Primo et al. |
| 9,701,181 B2 | 7/2017 | Moekler et al. |
| 9,834,068 B2 | 12/2017 | Cha et al. |
| 9,975,407 B2 * | 5/2018 | Still ........................ B60Q 3/80 |
| 10,434,838 B2 * | 10/2019 | Dunham ............ B60H 1/00871 |
| 10,544,930 B2 * | 1/2020 | Lehman ............ H01R 12/55 |
| 2001/0024048 A1 | 9/2001 | Hobson et al. |
| 2001/0050493 A1 | 12/2001 | Welter |
| 2004/0051337 A1 * | 3/2004 | Eich ................. B60J 3/0204 |
| | | 296/97.5 |
| 2004/0145209 A1 | 7/2004 | Peterson |
| 2005/0034555 A1 | 2/2005 | Staker |
| 2005/0230997 A1 * | 10/2005 | Tiesler .................. B60J 3/0278 |
| | | 296/97.1 |
| 2006/0061008 A1 | 3/2006 | Karner et al. |
| 2006/0098446 A1 * | 5/2006 | Barker ..................... B60Q 3/51 |
| | | 362/492 |
| 2006/0113819 A1 * | 6/2006 | Remy .................. B60J 3/0278 |
| | | 296/97.11 |
| 2006/0175861 A1 | 8/2006 | Ikeda et al. |
| 2008/0074866 A1 * | 3/2008 | Barker .................. B60J 3/0282 |
| | | 362/142 |
| 2008/0130305 A1 | 6/2008 | Wang et al. |
| 2008/0217950 A1 * | 9/2008 | Tiesler .................. B60J 3/0204 |
| | | 296/97.5 |
| 2008/0225515 A1 * | 9/2008 | Nicola .................. B60Q 3/252 |
| | | 362/137 |
| 2009/0121513 A1 | 5/2009 | Olep |
| 2010/0013263 A1 | 1/2010 | Okazaki et al. |
| 2010/0096878 A1 | 4/2010 | Wieczorek et al. |
| 2010/0117395 A1 | 5/2010 | Wieczorek et al. |
| 2010/0225248 A1 * | 9/2010 | Cruickshank .......... H05B 45/00 |
| | | 315/297 |
| 2011/0227362 A1 | 9/2011 | Rockafellow et al. |
| 2011/0260492 A1 | 10/2011 | Ogawa et al. |
| 2013/0069388 A1 | 3/2013 | Huff |
| 2016/0167573 A1 | 6/2016 | Janowiak |
| 2017/0313163 A1 | 11/2017 | Watts et al. |
| 2017/0313164 A1 | 11/2017 | Lehman et al. |

FOREIGN PATENT DOCUMENTS

| | | |
|---|---|---|
| JP | 2010179794 | 8/2010 |
| JP | 201142238 | 3/2011 |
| JP | 2011042335 | 3/2011 |
| WO | WO2010045438 | 4/2010 |

* cited by examiner

THIN VISOR

BACKGROUND OF THE INVENTION

1. Field of the Invention

The present invention relates generally to a movable sun visor for interior use in a vehicle, and more particularly relates to a sun visor wherein the visor body includes two visor body halves or shells adapted to close about and retain a carrier attached to a pivot rod.

2. Description of Related Art

Sun visors are well known and widely used in the prior art. Many different types of designs have been successfully employed in vehicles over the years. Many of these prior art visors have been developed in a variety of ways through which visor bodies and other interior components may be constructed and mounted within the vehicle. Advances in design can often add complexities to the manufacturing processes for interior components. There has been and continues to be a premium in the automotive industry on cost savings, and improvements in the efficiency and speed in the manufacturing processes for such components therein. One area of particular focus in the automobile technology field has been reducing the number and complexity of steps required to assemble interior components such as sun visors or visors for use in vehicles.

Generally in the prior art, manufacturing simplicity continues to drive innovations in the automotive industry, loss of quality and performance in the manufacturing of components for the sake of facilitating production is seldom, if ever, acceptable. There is a substantial body of prior art relating to the specific structure of the visor to provide a strong, light weight construction that matches or compliments the interior vehicle trim in a cost effective manner. Of particular interest has been the two shell type construction, which involves the molding of two separate shell pieces, which are then joined to form a visor body. In one typical shell design, the visor halves are formed as a single piece attached along the longitudinal edge and then folded to form the visor body. In another visor body shell design, the visor halves are formed separately and then attached to one another via welding or some other fastening technique. The exterior surface may be molded to provide a suitable visor surface, or a desired outer covering may be added in a variety of different ways known in the prior art. The two visor body halves or shell design allows the visor body to be constructed relatively quickly and easily, however the various components that are attached to the visor shell halves must in some cases be incorporated with several assembly steps prior to securing the shell halves together. For example, some of the known designs require insertion of additional mounting or journaling pieces for retention of the visor pivot rod within the visor body. The construction of the visors having such a design is relatively time intense. Moreover, the various slides, journals, retainers, etc., utilized in the construction may add significant expense and weight to the overall visor, along with unwanted noise and increase the number of components necessary to build one.

In some cases, eliminating parts may reduce the expense of manufacturing and constructing a visor. The decrease in size and weight, however can be accompanied by a decrease in strength. Rotatable visors are a concern where flimsy construction of the visor core, body and slider components may be insufficient to withstand repeated torque actions on the visor shell itself, and in some cases cause dislodging or breaking of the components. Furthermore, the consumers of motor vehicles require visors that are nearly silent in operation and do not involve unwanted noises or sloppiness when pivoting, sliding or rotating the visors. Hence, it is thus desirable in the art to provide a visor that is lightweight, easy to manufacture and uses relatively few components, yet utilizes a design imparting significant durability to withstand heavy and repeated use and to provide a solid construction with tight tolerances throughout the entire system. Furthermore, there is a need in the art for an improved thin visor that has a carrier and an overall visor body thickness of approximately seventeen to eighteen millimeters. There also is a need in the art for a sun visor that uses a thin visor concept that may have switches that power lights on and off for the visor vanity located in the headliner and are not arranged directly in the visor. There also is a need in the art for a visor that may have a sliding vanity or a flip up vanity depending on the design requirements.

SUMMARY OF THE INVENTION

One object of the present invention may be that it provides an improved thin visor.

Another object of the present invention may be that it provides a thin visor that has a carrier arranged over a pivot rod.

Still another object of the present invention may be that it provides a thin visor that includes a vanity switch that may turn on lights arranged in a headliner of the vehicle to illuminate the mirror and person looking in to a mirror in the vanity.

Still another object of the present invention may be that it provides for a thin visor having a sliding vanity door that allows for a sliding door to cover a vanity mirror arranged within a body of the thin visor.

According to the present invention, the foregoing and other objects and advantages are obtained by a novel design for a thin visor for use in a vehicle. The thin visor generally comprises a pivot rod and a first and second shell being engageable to form a visor body. The visor also comprises a vanity secured to the visor body and a carrier positioned in the visor body, wherein the carrier engages with the pivot rod. The visor also comprises a first electrical contact arranged on an end of the pivot rod and a second electrical contact arranged on a surface of the carrier. The visor further comprises a third electrical contact arranged on a surface of the carrier. The visor body generally may have a thin design with a thickness of approximately between seventeen to eighteen millimeters.

One advantage of the present invention may be that it provides an improved thin visor.

Still another advantage of the present invention may be that it provides an improved thin visor having a carrier arranged over a pivot rod.

Still another advantage of the present invention may be that it provides a thin visor having a visor rotation switch therein along with lights arranged in a headliner of the vehicle in order to provide light for a vanity mirror arranged within the visor body.

Still another advantage of the present invention may be that it provides a thin visor that is easier to manufacture and lower in costs for original equipment manufacturers.

Still another advantage of the present invention may be that it provides a thin visor that incorporates a sliding vanity door into the visor body to allow for covering and uncovering of a vanity mirror arranged therein.

Other objects, features and advantages of the present invention will become apparent from the subsequent description and appended claims, taken in conjunction with the accompanying drawings.

BRIEF DESCRIPTION OF THE EMBODIMENT(S)

Figure 1:
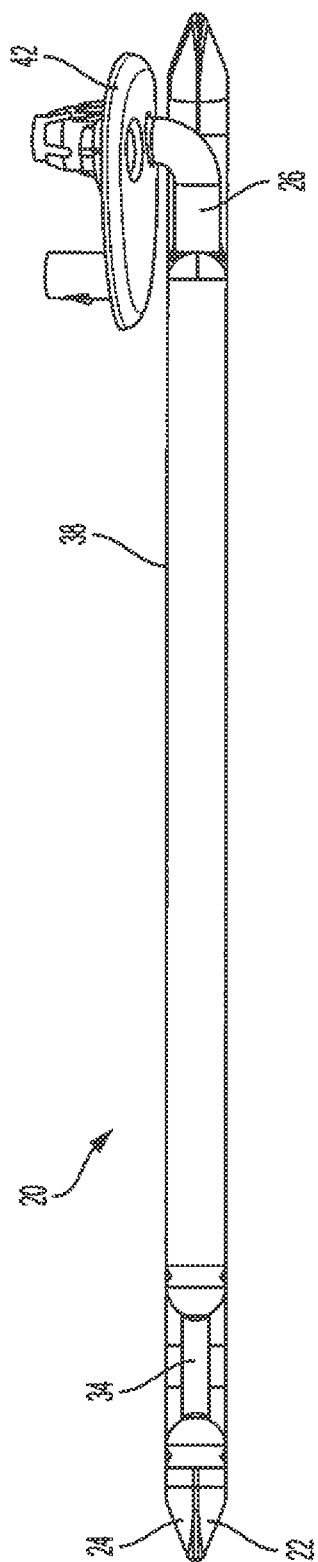
FIG. 1 shows plan view of a thin visor according to the present invention.
Figure 2:
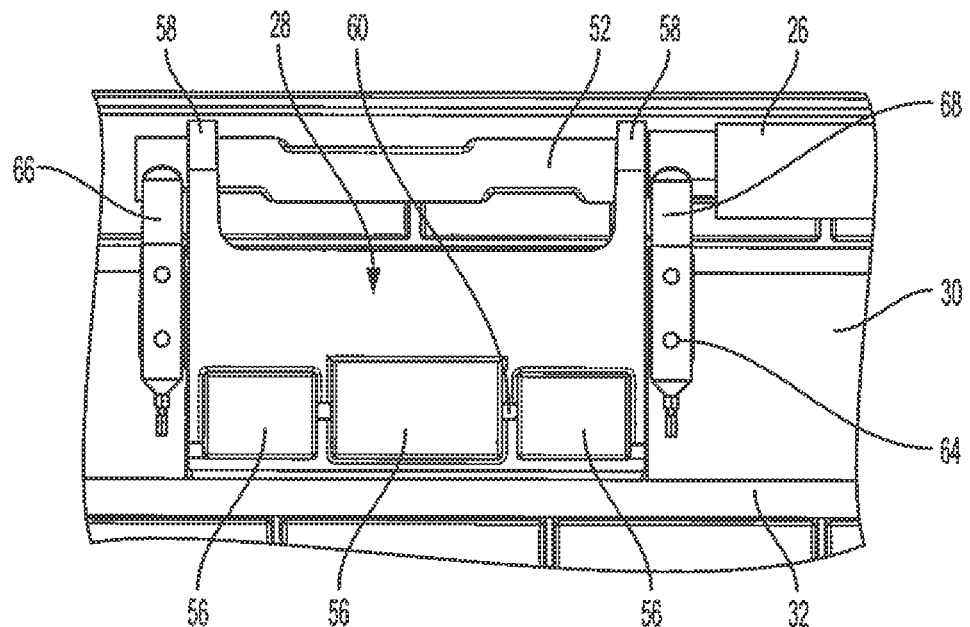
FIG. 2 shows a close up view of a carrier for use with the thin visor according to the present invention.
Figure 3:
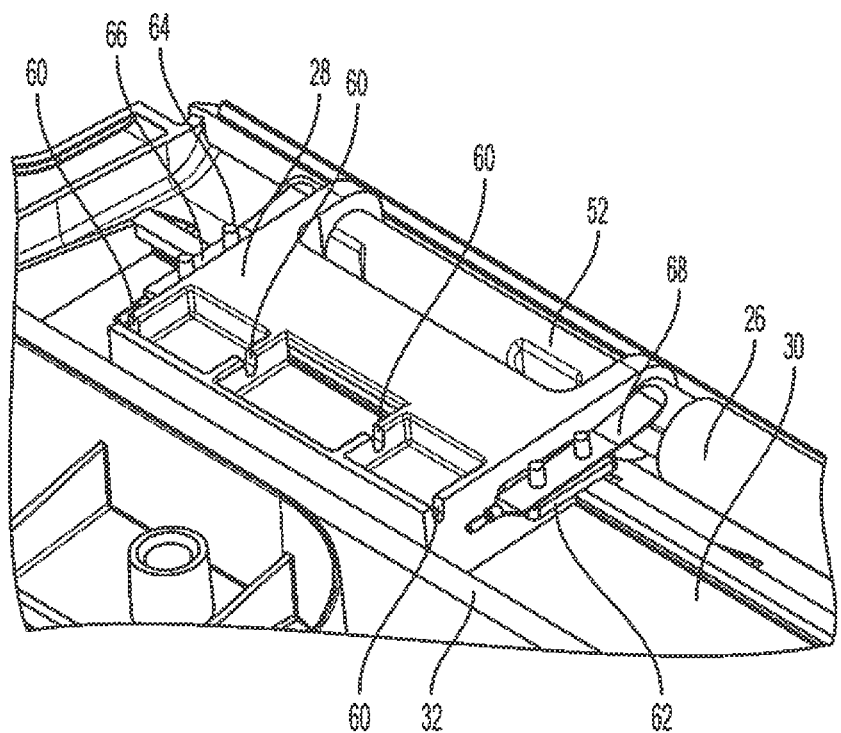
FIG. 3 shows a perspective view of a carrier according to the present invention.
Figure 4:
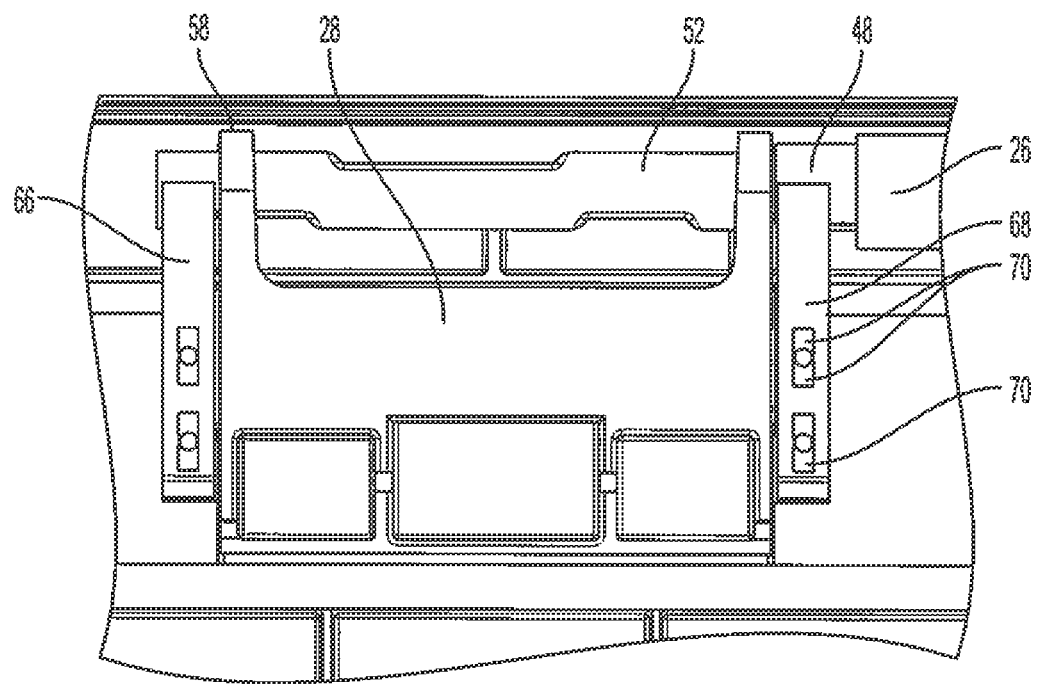
FIG. 4 shows a side view of a carrier used in the thin visor according to the present invention.
Figure 5:
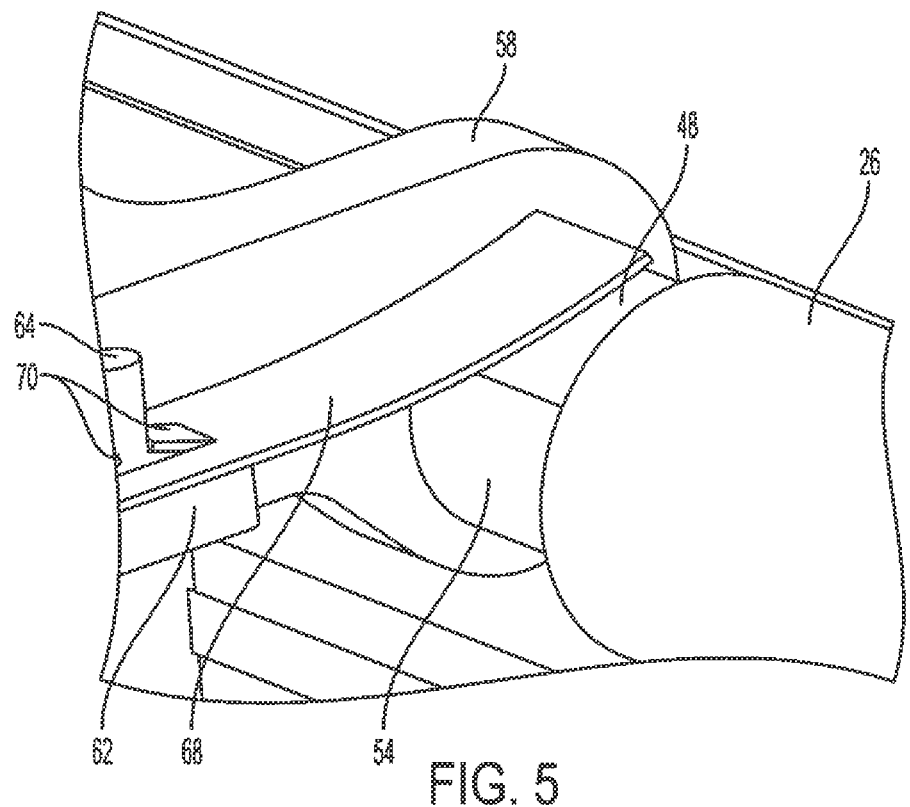
FIG. 5 shows a close up view of an electrical contact used in the thin visor according to the present invention.
Figure 6:
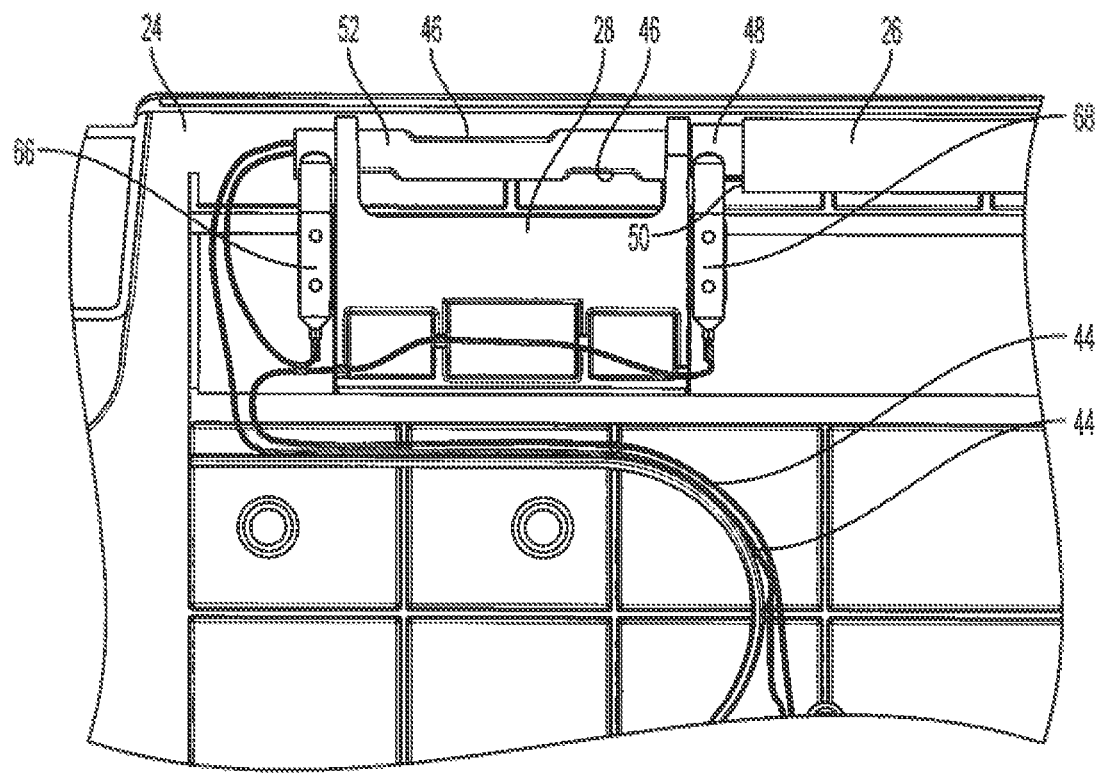
FIG. 6 shows a perspective view of a carrier used in the thin visor according to the present invention.
Figure 7:
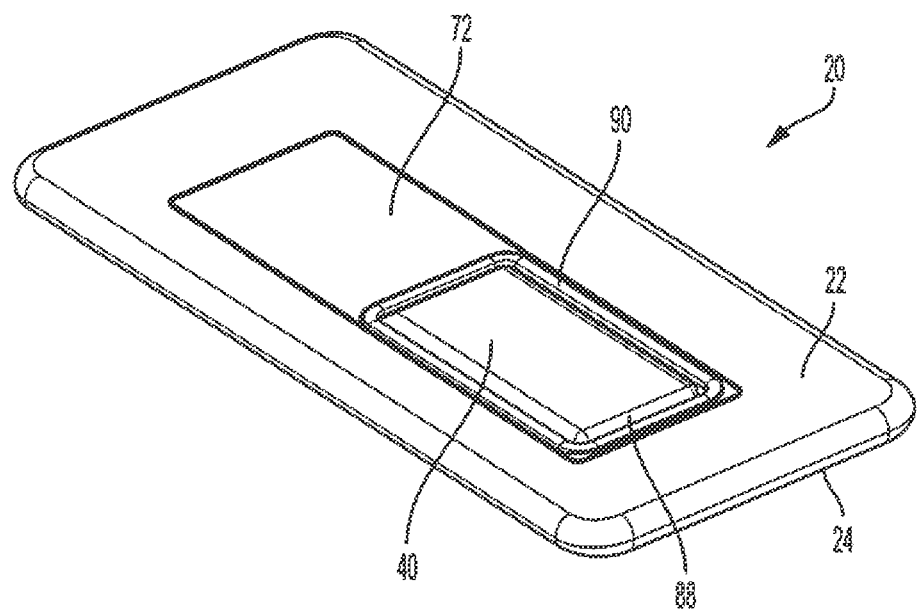
FIG. 7 shows a thin visor according to the present invention.
Figure 8:
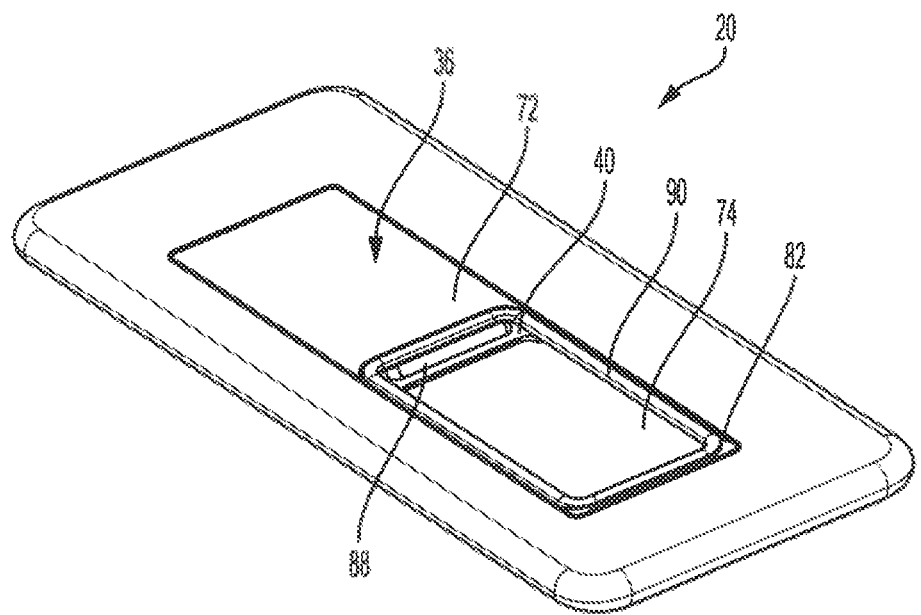
FIG. 8 shows a perspective view of a sliding vanity door of a thin visor according to the present invention.
Figure 9:
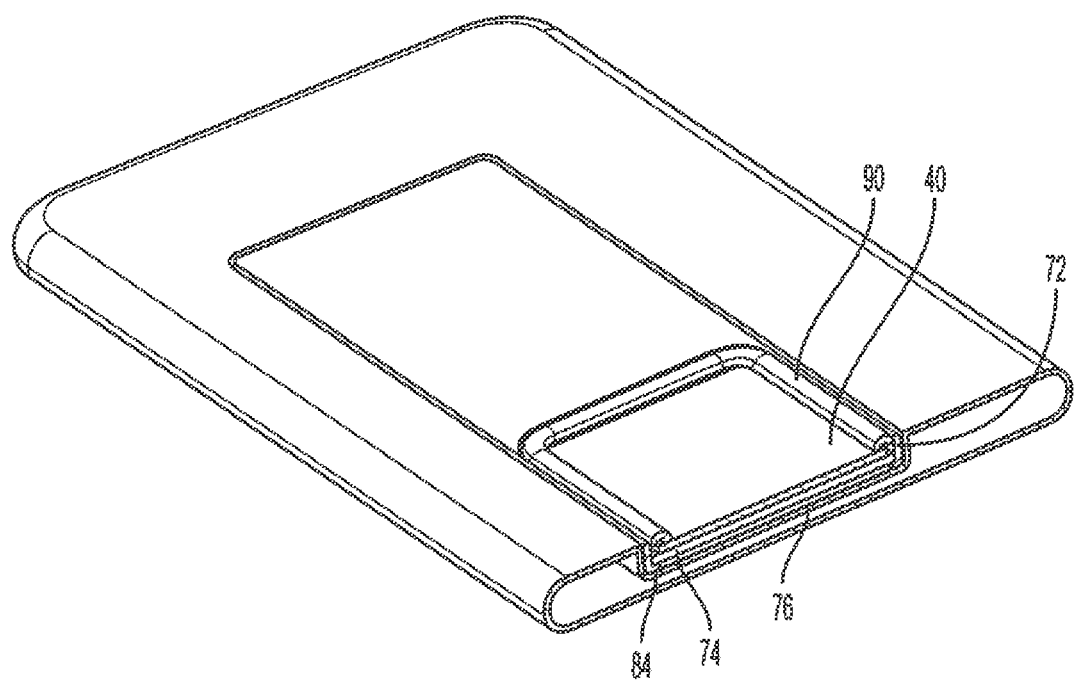
FIG. 9 shows a cross section of a thin visor according to the present invention.
Figure 10:
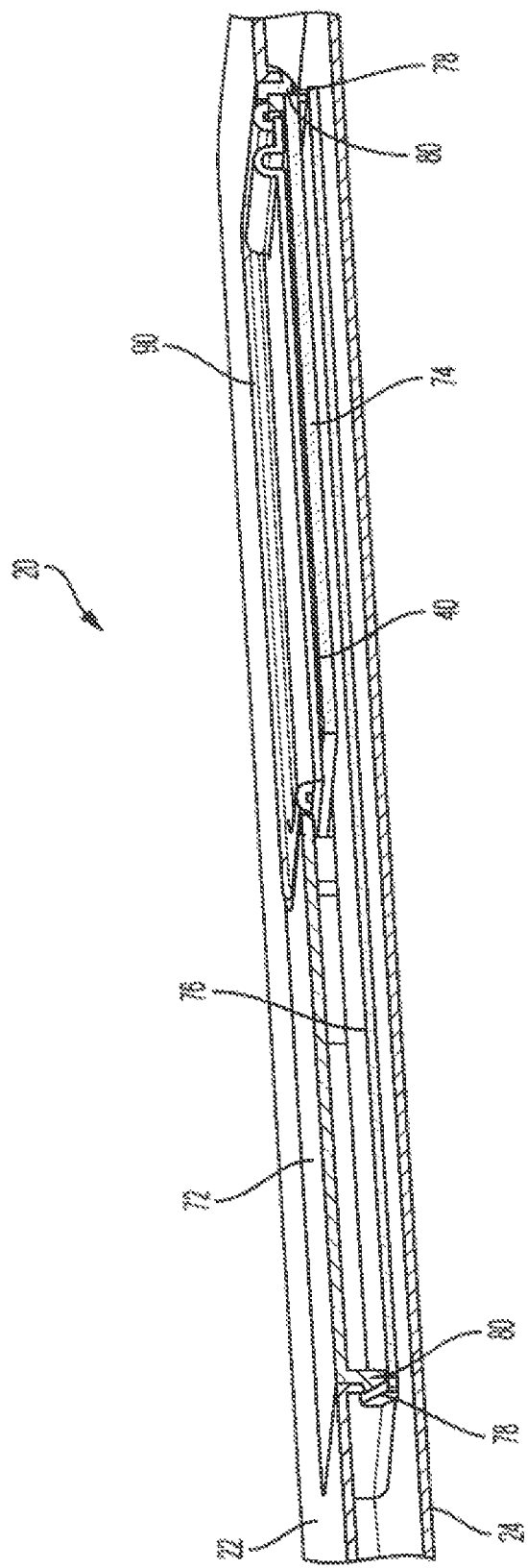
FIG. 10 shows a partial cross sectional view of a thin visor according to the present invention.
Figure 11:
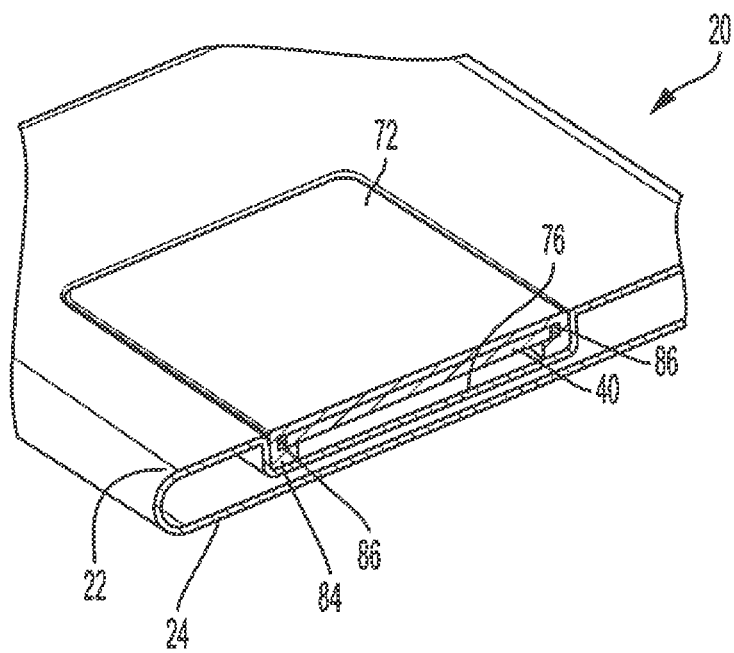
FIG. 11 shows a cross section of a thin visor according to the present invention.
Figure 12:
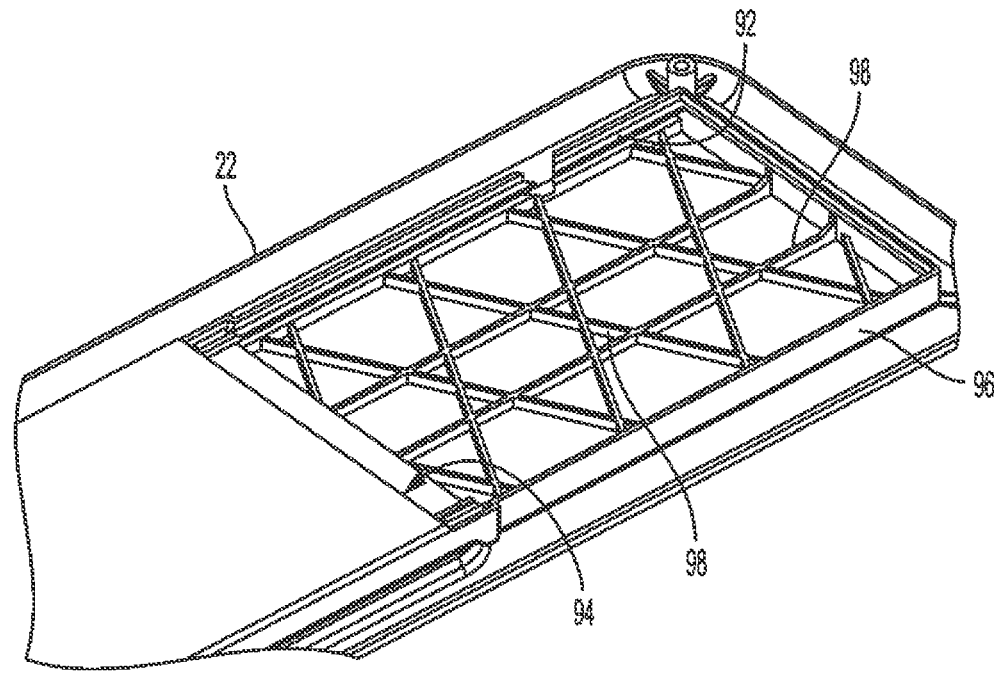
FIG. 12 shows a perspective view of a thin visor with a sliding vanity door according to an alternate embodiment of the present invention.

Referring to the drawings, there is shown a thin visor, sun visor or visor 20 according to an embodiment of the present invention. The visor 20 may be a sliding visor or a non-sliding visor. The visor 20 may be a thin visor, a standard size visor or any other type or size of visor according to the present invention. Generally, the present invention broadly provides a dual shell or halves 22,24 which form a visor body. The vehicle sun visor 20 has a pivot rod 26 mounted to a carrier 28, wherein the pivot rod 26 and carrier 28 are captured within the visor shell portions 22,24 when they are secured together. The carrier thus rides and/or is secured in one position without movement in the visor body itself and in one embodiment is preferably retained via a rail to one of the visor half shells within the visor body. It should be noted that the retention may also include other surfaces and/or features such as channels, shelves and the like which may be molded integrally with the shell portions 22,24. Similarly, the pivot rod 26 rides in the visor body via bracket, bezels or similar components to support the pivot rod 26 therein. These components may be molded directly in to the visor half shells 22,24. Other aspects of the present invention include methods for manufacturing a sun visor 20 are also described herein. Furthermore, it should be noted that the visor 20, as shown in the present application, may be used in any known type of vehicle, such as but not limited to automotive vehicles, maritime vehicles, aerospace vehicles, military vehicles, and any other known vehicle that may have a need for the sun to be blocked from filtering into the interior compartment of the vehicle. It should also be noted that generally all of the components of the thin visor 20, according to the present invention, may be made of a plastic material that is capable of either being extruded, molded, or shaped by any known manufacturing process. However, any other known metal, ceramic, plastic, composite, natural material or any other known material may also be used for any of the parts or components of the thin visor 20 described herein.

In one embodiment shown in the figures, the thin visor 20 includes a first and second halves or shells 22,24 that are engageable to form the elongate visor body. Various molded features may be included on each shell to facilitate engagement of the shells 22,24. For example, complimentary structures may be formed on the respective visor shells that allow a snap fit therebetween. In one contemplated embodiment, the shells 22,24 may be formed having the two visor shells made of separate substrate halves and then combined together and closed with respect to one another and vibration welded together to form the visor body as shown in the drawings. However, it should be noted that other contemplated embodiments may have the shells 22,24 be formed by having an integral or connected longitudinal peripheral edges respectively. This would allow for the edges to fold around the connected longitudinal peripheral edge to complete a clam shell visor in one embodiment. Other embodiments are contemplated in which the shells 22,24 are formed as separate, unconnected members and are connected using different fastening techniques other than vibration welding, such as but not limited to locks, fasteners, chemical fasteners, mechanical fasteners, or any other type of connecting methodology for mating two objects to one another. Although separate and unconnected shells 22,24 are preferred, connected shells may also be used depending on the design requirements. The visor 20 further includes a pivot rod 26 that is arranged into one end of the visor body and connected on the opposite end to a headliner or roof of the vehicle to which the sun visor is arranged. The thin visor 20 is preferably formed such that the shells 22,24 may be closed about the pivot rod 26 and as such capture the pivot rod 26 therebetween. Also, the thin visor 20 may include a carrier 28 which is captured within one or between both of the shells 22,24 via a rail mechanism 30 arranged from an inside surface of one shell or via any other methodology. All of the component parts of the thin visor 20 may be manufactured from known materials and by known processes, such as but not limited to any type of plastic, metal, ceramic, composite, natural materials or any other known material and by any type of molding technique, forming technique, chemical or mechanical process that may be used to design and make the components as described herein.

Generally, the shells 22,24 are formed by injection molding of plastic material in a conventional manner. For example, the shells 22,24 may be formed from a molded polyethylene or by some other suitable method and/or material. The first and second shells 22,24 generally include retaining surfaces in any known shape, such as arcuate retaining surfaces, flat or angle retaining surfaces, all of which may be elongate, or trough shaped surfaces extending parallel to an edge of the visor shells and defining a portion of a visor wall. It should further be appreciated that the present invention may encompass designs with retaining surfaces that vary in dimension between longer, trough shaped features and more narrow arcuate ledges as shown in the figures. It should further be noted that one of the shells 22,24 may or may not have a rail 30 extending from a predetermined inside surface thereof and extending in a longitudinal direction. It should be noted that the rail 30 may extend a predetermined distance along the inside surface of one of the visor half shells 22,24. In one contemplated embodiment, the rail 30 may generally have an L-shape when viewed in cross section and extend from the inside surface of one of the shells 22,24. One or both of the visor shells 22,24 may also include a shelf 32 that extends out from an interior wall thereof, wherein the shelf 32 extends a predetermined longitudinal distance across a predetermined portion of the inside surface of one or both of the visor half shells 22,24. The shelf 32 generally may have a rectangular top surface that extends perpendicular from the inside surface of the visor half shell 22,24 and may include a plurality of different sized and shaped brackets arranged between a bottom surface of the shelf and the inside surface of the visor half shell. It should be noted that in one contemplated embodiment, the carrier 28 described herein may have a bottom surface arranged in a sliding or non-sliding manner along the top surface of the shelf 32 and have the rail 30 interengage with a flange or riding surface arranged along a generally mid point of the carrier. The rail 30 and the shelf 32 of the first shell 24 of the visor body are generally parallel to one another with the rail 30 being arranged above or towards the top of the visor half shell 22,24 with respect to the shelf 32. It should further be noted that the visor half shells 22,24 may include other surfaces that receive and hold various components of the thin visor 20, such as but not limited to the pivot rod 26, a D-ring 34, a vanity 36, cover material 38 arranged over the visor body, a vanity switch, flush or side mounted universal openers, a detent assembly, visor rotation switches, and a sliding vanity door 40. The visor half shells 22,24 may also include any other known plurality of orifices or other surfaces, journals or bracket extending from either an inside surface, side surface or outside surface depending on the design requirements of the thin visor 20.

The thin visor 20 also includes a pivot rod 26 which is attached at one end to a bracket and connector 42, which is secured to a headliner or roof of a vehicle. The bracket 42 may have a connector secured thereto to connect the electrical system of the vehicle via a wire/wires 44 or other mechanism to the bracket 42. The wire or wires 44 may then be passed through the pivot rod 26 or traversed in another manner into the visor body. However, it should be noted that a solid pivot rod may be used and may or may not be capable of passing electricity therethrough to allow for illumination of a vanity mirror that may be arranged in the visor body. Generally, the visor rod 26 may be hollow which may allow for the wire or wires 44 to pass therethrough and then provide power to a vanity 36 arranged within the visor body or to lights arranged in the headliner or at another location in the vehicle or visor. The bracket 42 may be secured to the roof via fasteners or any other known methodology. The bracket 42 may include an orifice that may receive one end of the pivot rod 26 near an elbow of the pivot rod 26, wherein the pivot rod 26 generally has an angle of sixty to one hundred twenty degrees at the elbow. The pivot rod 26 may be secured and capable of rotation within an orifice of the bracket 42 and may also be swung between a front windshield of the vehicle and a side window of the vehicle to block the sun from any angle. The pivot rod 26 may be of any known length and diameter depending on the design of the visor and the automobile into which it is arranged. The wires 44 may be connected between the electrical system of the automobile and passed to an LED or other lighting mechanism for illumination of a visor mirror in the vanity 36. It should be noted that the visor 20, pivot rod 26 and bracket 42 may be made of any known material such as but not limited to plastic, ceramic, composites, metals, natural materials, etc. The visor rod 26 may also include a predetermined notch or notches 46 arranged near one end thereof, wherein that notch 46 generally has the form of a rectangular cutout arranged on a predetermined surface of the visor rod 26. It is also contemplated to use a visor pivot rod 26 that does not have a notch 46 surface arranged thereon. The pivot rod 26 may have one predetermined diameter arranged around an entire length thereof in one contemplated embodiment. However, the pivot rod 26 may also have arranged on a first end, which is opposite that of the elbow end of the pivot rod, a reduced diameter portion 48. This reduced diameter portion 48 may extend a predetermined length at the first end of the pivot rod 26. At the intersection of the larger diameter portion and the reduced diameter portion 48 of the pivot rod 26 may be formed a shoulder 50. The reduced diameter portion 48 of the visor pivot rod 26 may extend a predetermined length such that the carrier 28 may be arranged entirely over the reduced diameter portion 48 of the pivot rod 26. Arranged over or integrated therein with the reduced diameter portion 48 of the visor pivot rod 26 is a first electrical contact 52. It should be noted that the first electrical contact 52 generally is made of a metal material, however any other known material capable of conducting electricity therethrough may also be used for the first electrical contact 52. Generally, the first electrical contact 52 may have a cylindrical shape with a flange 54 extending from an end thereof. It is contemplated to place the first electrical contact 52 over the reduced diameter portion 48 of the pivot rod 25 with an interference or press fit or to secure it via any other known chemical or mechanical fastening technique to the reduced diameter portion 48 of the pivot rod 26. The first electrical contact 52 may or may not include a plurality of contact notches arranged along an outer surface thereof, wherein these contact notches mimic, match, and/or layover and cover the notches 46 described above. These contact notches may be used in order to allow for the use of a detent in providing the necessary resistant force during rotation of the visor from a stored or homed position along the top of the headliner to a down or in use position by a user of the vehicle. The contact notches may allow for the controlled rotation of the visor and the swinging of the visor into different protective positions with relation to the vehicles windows. It should be noted that it is also contemplated to use a first electrical contact 52 that does not have the notches or indentations arranged in an outer surface thereof and have a smooth outer cylindrical surface. The first electrical contact 52 may or may not extend from the edge of the reduced diameter portion 48 on one end. The other end of the first electrical contact 52 may or may not abut against the shoulder 50 defined by the intersection of the reduced diameter portion 48 with the regular diameter portion of the pivot rod 26. It should be noted that by having a generally cylindrical shape the first electrical contact 52 may completely surround some or all of the outer circumference or surface of the reduced diameter portion 48 of the pivot rod 26 on the first end thereof. The flange 54 extends from one end of the first electrical contact 52 and abuts or contacts against the shoulder 50 at the intersection of the reduced diameter portion 48 and the larger diameter portion of the pivot rod 26. The flange 54 generally may only cover a predetermined portion of the outer surface or circumference of the reduced diameter portion 48 of the pivot rod 26. In one contemplated embodiment, a predetermined sized arc or number of degrees of an outer circumference of a circle may define the flange 54. In one contemplated embodiment, the flange 54 may cover an approximate ninety degree portion or arc arranged on an outside surface or circumference of the reduced diameter portion 48 of the pivot rod 26. However, it should be noted that any other sized arc from zero degrees to three hundred sixty degrees may be used for the flange 54 depending on the design requirements and materials used within the first electrical contact 52. Hence, near the shoulder 50 of the pivot rod 26 the flange 54 may only cover a predetermined portion of the outer surface of the outer circumference of the reduced diameter portion 48 of the pivot rod 26 while the material that the pivot rod 26 is made of, generally a plastic, composite or other non-electrically conductive material, may be visible on the other outer portions of the circumference adjacent to the flange 54. Hence, with the flange 54 having a predetermined length extending from one end of the first electrical contact 52 only that length in combination with the size of the arc of the flange 54 may cover the outer circumference of the reduced diameter portion 48 near the shoulder 50 in the electrically conductive first electrical contact material. Hence, the other portions of the reduced diameter portion 48 adjacent to the flange 54 may be non-conductive material which is used to form the pivot rod 26.

The visor pivot rod 26 is arranged within a carrier 28, which is positioned and held within the visor half shells 22,24 according to the present invention. The carrier 28 also may include a first, second and third cavity 56 arranged on one side thereof, wherein the cavities 56 generally have a rectangular or square shape. The carrier 28 generally has a rectangular shape, however any other shape may also be used. A first and second arm 58 may extend from a top thereof and at both corners thereof. The arms 58 are parallel to one another and generally have a circular orifice near a top thereof. The orifices receive the pivot rod 26 therethrough. A wall or panel may be arranged between the arms and generally has a square or rectangular shape. The wall may be arranged on each side and from a top of the carrier 28. It should be noted that the first, second and third cavity 56 arranged on one side of the carrier 28 may or may not include a notch 60 that extends into the side of the carrier 28 a predetermined distance. A bottom surface of the carrier 28 generally may be a flat surface that is allowed to ride along or sit stationary on the shoulder 32 arranged from one or both of the visor half shells 22,24. The carrier 28 may also include on the side surface opposite that of the three cavities 58, a channel or other connecting mechanism that is used to engage with the rail or flange 30 extending from an inside surface of one of the visor half shells 22,24 in order to secure the carrier 28 in a predetermined position with respect to the visor half shells 22,24 when the visor body is completed. It should be noted that the notches 60 described with regard to the three cavities 58 may have two of the notches 60 offset from the other two, such that four notches are arranged in the carrier 28 with the two outside notches 60 being arranged below the two inside notches 60 as shown in the drawings. It should be noted that it is contemplated that in one embodiment the carrier 28 may be fixed in one specific position during use with the thin visor 20 described herein. However, it is also contemplated that the carrier 28 may be slidably arranged within the visor body allowing for the carrier 28 to slide with relation to the visor body, thus allowing for the visor 20 to move to different positions within the interior cabin of the vehicle. Therefore, either a sliding or non sliding visor 20 may be used with the carrier 28 and the carrier 28 is capable of sliding with relation to the visor body or being fixed in one position with relation to the visor body during operation thereof. The carrier 28 may also include a flange 62 extending from a first end and a second end thereof. Generally, the flange 62 may be of a rectangular shape and extend from either the first or second end or both the first and second end of the carrier 28. The flange 62 may have a predetermined length and width and thickness depending upon the design requirements of the visor 20. Generally, the flange 62 may extend from the visor body such that one of the long ends of the rectangular shaped flange 62 may be in contact with a first and second end of the carrier 28, wherein the two shorter edges and one of the long edges of the flange 62 will not be in contact with a surface of the end of the carrier 28. Generally, arranged from the first and second end the flange 62 may be molded directly into the carrier 28, however it is also contemplated to secure the flanges 62 after molding or manufacturing thereof via machining or any other type of fastening techniques, such as mechanical fastening techniques or chemical fastening techniques that may or may not use a glue, epoxy and the like. Arranged from a top surface of the first and second flange 62 may be at least one post 64. The post 64 generally may have a cylindrical shape and may be solid or hollow. The post 64 generally may be arranged at a mid point of the top surface of the first and second flange 62. It should be noted that in one contemplated embodiment shown in the drawings, a first and second post 64 are aligned generally at or along the mid point or mid line of the first and second flange 62 and extend in an outward direction from the top surface of the flange 62. The first, and second post 64 as shown in the drawings may have a predetermined distance arranged therebetween and may have a predetermined diameter which may interact with, contact or mate with a second 66 and third electrical contact 68. It should be noted that the first and second flange 62 generally may extend from a mid line or mid point of the first end and second end of the carrier 28. However, the flange 62 may extend at any other predetermined position from the ends of the carrier 28 depending on the design requirements of the visor 20. The carrier 28 may also include a second electrical contact 66 and a third electrical contact 68 arranged thereon. Generally, the second and third electrical contact 66,68 have the same design and same shape and hence may be described as one unit herein. The second and third electrical contact 66,68 generally may have a rectangular shape with a rounded edge at one end thereof and a wire connector arranged at the opposite end thereof. It should be noted that the first end of the second and third electrical contact 66,68 with the rounded edge may have a squared off edge or any other shaped edge thereon. The wire connector located on the second end of the second and third electrical contact 66,68 generally may have a predetermined shaped orifice therein which may be used to crimp or be soldered to the wire 44 which passes through the hollow pivot rod 26 from the electrical system of the vehicle and/or lights arranged in the headliner or at other areas within the visor 20 according to the present invention. The second and third electrical contacts 66,68 generally may each have a first and second orifice or gap arranged at or near a midline thereof. The second and third electrical contacts 66,68 may include a set of locking fingers 70 arranged therein such that the orifice, in this case a generally circular orifice, is arranged between the first and second finger 70 which forms the pair of fingers arranged in each of the second and third electrical contacts 66,68. The first and second fingers 70 face one another and have the predetermined shaped orifice arranged at their ends thereof, wherein the orifice or gap may interact with the first and second post 64 arranged on the flange 62 of the carrier 28. The second and third electrical contacts 66,68 may be arranged over the first and second posts 64 arranged from a top surface of the flange 62 of the carrier 28 thus securing the second and third electrical contacts 66,68 in a predetermined position with respect to the carrier 28. In operation, the second and third electrical contacts 66,68 may have a bottom surface thereof contact or engage with a top surface of the first and second flange 62. The pair of fingers 70 arranged on the second and third electrical contacts 66,68 may interengage and be in contact with an outer surface of the first and second post respectively in order to secure the second and third electrical contact 66,68 in a predetermined position with respect to the carrier 28 and pivot rod 26 arranged therein. The second electrical contact 66 first end may have its bottom surface engage with the first electrical contact 52 at all times because the first electrical contact 52 arranged at or near the edge of the first end of the pivot rod 26 may have the first electrical contact 52 arranged around the entire three hundred sixty degree circumference thereof. The third electrical contact 68 may engage with the pivot rod 26 and/or the flange 54 arranged from an end of the first electrical 52 contact at a predetermined position. When the visor 20 is in the stored or home position the third electrical contact 68 bottom surface may engage with or contact the plastic or other material outer surface of the reduced diameter portion 48 of the pivot rod 26. This may allow the electrical circuit to be opened, thus not providing electricity to lights or LED's arranged in the headliner or other portions of the visor from illuminating when the visor 20 is in its home position against the headliner or roof of the interior of the vehicle. When the visor 20 is moved down into its open or used position, the rotation of the carrier 28 with respect to the pivot rod 26 may allow for the third electrical contact 68 bottom surface to engage with or contact the flange 54 of the first electrical contact 52 thus closing the electrical circuit between the lights and the electrical system of the vehicle and allowing electricity to flow to the LED or light bulb and illuminate the vanity mirror for the person using the vanity mirror located in the visor 20 within the vehicle. Hence, as long as the visor 20 is rotated into its down or in use position, which generally is approximately a ninety degree rotation from its stored position, however any other number of degrees may also be used, the visor vanity lights may be illuminated whether arranged within the vehicle headliner or arranged within the vanity or other portions of the visor body. When the visor 20 is returned to its home position against the headliner inside roof of the vehicle, the third electrical contact 68 disengages from the first electrical contact 52 and hence opens the circuit thus stopping the flow of electricity between the electrical system and the lights of the vanity 36. It should be noted that the accuracy and sensitivity of the switch may be tuned depending on the predetermined arc defined by the flange 54 of the first electrical contact 52. It should be noted that the first and second wire 44 which are passed through the pivot rod 26 may have one of the wires connected to the second electrical contact 66 and the other wire connected directly to the light source, either in the headliner or elsewhere within the vehicle visor 20 while a third wire 44 is connected to the third electrical contact 68 and to the light source arranged either in the headliner or other portion of the vanity or visor 20. Thus, when the second and third electrical contact 66,68 both engage with or contact the first electrical contact 52 electricity may pass through from the electrical system of the vehicle to the light source, in essence closing the circuit allowing electricity to flow and light to emit and shine from the light source. It should be noted that it is also contemplated to use the same first electrical contact 52 and second and third electrical contact 66,68 system with a sliding visor, wherein the flange 54 having a specific design may allow for passing of the electricity between the vehicle's electrical system and the light source of the vanity for the visor. It should further be noted that it is also contemplated that a solid metal first electrical 52 contact having a similar cylindrical shape as that of the reduced diameter portion of the visor pivot rod 26 may also be used in conjunction with a flange that extends from an end surface of the pivot rod 26, wherein that flange has a generally half circle or circular shape with a predetermined arched size wedge removed therefrom, wherein the flange 54 of the first electrical contact 52 may be inserted into that wedge and be secured into that wedge or cutout portion and secured into the end of the visor pivot rod 26.

A detent assembly may be arranged between the carrier 28 and pivot rod 26. Any known design for the detent assembly may be used. The detent may have the pivot rod 26 pass therethrough and engage a top surface of the spring when the carrier 28 and detent assembly is arranged within the visor half shell 22,24 and the pivot rod 26 is arranged therethrough. The detent assembly may be used to secure the pivot rod 26 to the visor body via the spring engaging with an upward force against an outer surface of the pivot rod 26 such that the pivot rod 26 may be pinched between an inner surface of the carrier 28 and/or arms and a top surface of the spring thus allowing for a secure connection between the pivot rod 26 and the visor body. It should be noted that the shape of the spring may allow for the efforts and force necessary to slide and rotate the visor body with respect to the pivot rod 26. It should further be noted that in one contemplated embodiment, all of the parts of the detent assembly are made of a metal material, however any other plastic, ceramic, composite, or natural material may also be used for the detent assembly components. It should also be noted that any other shape may also be used for the spring.

In one contemplated embodiment of the thin visor 20, a wire routing option may be arranged therein and may have a wire routing system used in conjunction therewith. The thin visor 20 may also include a vanity 36. The vanity 36 generally may include a vanity door 40, a vanity frame 72, a vanity mirror 74 with optional lights arranged therein, nearby or in a headliner of the vehicle. If the vanity 36 is illuminated, the vanity 36 may also include at least one lens to disburse light in a predetermined manner or a light guide/specialized mirror to perform such light dispersion. The vanity frame 72 generally has a rectangular shape. It should be noted that any other shape may be used for the vanity frame 72 depending on the pocket 76 arranged within an outer surface of one of the visor half shells 22,24. In the present invention, one of the visor half 22,24 shell generally has arranged on an outer surface thereof a rectangular shaped pocket 76 that may have curved corners but may not have curved corners. The pocket 76 may be arranged a predetermined distance into the outer surface of the visor half shell 22,24 and may have a predetermined first and second orifice 78 arranged on each end thereof, wherein the orifice 78 is a locking orifice that forms a locking surface that interengages with a locking member 80 arranged from a bottom surface of the vanity frame 72. The locking orifices 78 arranged within the pocket 76 may have any generally known shape, but generally have a rectangular or square shape or may have any other known shape depending on the design of the locking members 80 extending from a bottom surface of the vanity frame 72. Generally, the vanity frame 72 with the rectangular shape may have a predetermined shaped orifice arranged at or near one end thereof, wherein the predetermined shaped orifice may approximately extend one half the length of the vanity frame 72. Hence, the vanity frame 72 generally has a predetermined shaped orifice in the general shape of a rectangle such that it mimics the overall shape of the vanity frame 72. The vanity frame rectangular orifice 82 may be arranged at or near one end thereof such that a small outer edge member or portion of the vanity frame 72 remains intact in part defining the orifice 82. The opposite half of the vanity frame 72 may have a solid surface such that it may be made of the same material and blend into the outer surface of the visor half shell 22,24. When the vanity frame 72 is arranged within the vanity half shell 22,24, the vanity frame 72 may be flush with the outer surface of the vanity half shell 22,24 to ensure for an aesthetically pleasing look to the outer surface of the vanity frame 72 and visor 20. The vanity frame 72 may have a locking finger or member 80 extending from a surface thereof, wherein the locking finger 80 interengages with a locking surface which is arranged within one of the visor half shells 22,24, such that the vanity frame 72 may be secured with respect to the visor half shell 22,24 within the pocket 76 via at least one locking finger 80 arranged from a bottom surface of the vanity frame 72. In one contemplated embodiment, a first and second locking finger 80, one each extending from each outer short edge of the vanity frame 72, may be arranged from a wall or bottom surface thereof and may include a locking shoulder that may interengage with the locking surface of the locking orifice 78 of the pocket 76 of the visor half shell 22,24. This may allow the vanity frame 72 to be snap locked into place in a predetermined position with regard to the vanity half shell 22,24. It should be noted that the vanity frame 72 also may include an inward extending flange 84 arranged from the wall or side wall around the outer periphery of the vanity frame 72 thereof. The vanity frame 72 wall may have a predetermined length that may mimic that of the depth of the pocket 76 of the visor half shell 22,24. Thus, the side wall extends around the entire outer periphery of the vanity frame 72. The inward extending flange 84 may extend from an inside surface of that sidewall of the vanity frame 72 a predetermined distance. It should be noted that the inward extending flange 84 may have a predetermined thickness that may vary depending on the location of the flange 84 with respect to the orifice 82 of the vanity frame 72. Directly below the orifice 82, the inward extending flange 84 may have a thinner profile than the thicker inner extending flange 84 portion arranged under the closed or solid portion of the vanity frame 72. The thicker portion of the inner extending flange 84 may form a pair of channels 86 along the longer or longitudinal edges of the vanity frame 72. These channels 86 may have a predetermined size gap associated therewith which may allow for the vanity door 40 to be slidingly arranged within the pair of channels 86 arranged under the solid outer portion of the vanity frame 72. These channels 86 may extend the entire half length of the vanity frame 72 associated with the solid outer surface thereof. It should be noted that the pair of channels 86 may be arranged directly adjacent to a bottom surface of the solid top portion of the vanity frame 72. Thus, this allows for the door 40 to be arranged directly under the solid surface of the vanity frame 72 when the door 40 is in its stored or open position, such that the vanity mirror 74 is visible to the user of the vanity 36. It should be noted that any other shaped vanity frame 72 may be used depending on the design requirements of the vanity mirror 74, such as a square shape, triangular shape, oval shape, circular shape, etc. The door 40 generally has a rectangular shape with a predetermined length and thickness. Generally, the length is such that when the door 40 is slid into its closed position, such that the vanity mirror 74 is not visible, the entire vanity mirror 74 and orifice 82 in which the vanity mirror 74 is arranged, may be covered by the door 40. The door 40 may slide in a side to side motion such that it slides within the pair of channels 86 arranged within the vanity frame 72. The door 40 may include a handle 88 directly molded or arranged on an outer surface thereof. Generally, the door handle 88 may be formed during the molding or forming process of the door 40 such that the handle 88 may have a U-shaped cross section when viewed in cross section. The U-shaped cross section may provide a bump or handle 88 on an outer surface of the door 40 to allow for a user to grasp the bump or handle 88 and slide the door 40 into its open position, such that the vanity mirror 74 is visible to the user of the visor 20. It should be noted that the vanity door 88 may have any known thickness, but generally the thickness may be such that it rides smoothly and comfortably within the gap formed in the pair of channels 86 arranged within the vanity frame 72. It is also contemplated to use specific materials along the pair of channels 86 and/or the outer edge of the vanity door 40 in order to provide for easy sliding efforts between the open and closed position for the sliding door 40 of the vanity 36. The vanity mirror 74 may have a rectangular shape or a shape that may mimic that of the orifice 82 through the one half portion of the vanity frame 72. It should be noted that the mirror 74 may have any other known shape, depending on the shape of the orifice and the design requirements of the vanity 36. The vanity mirror 74 may be arranged within the vanity frame 72 such that it is in contact with the inner extending flange 84 arranged at a bottom portion of the side wall of the vanity frame 72. It may be in contact with the thinner portion of the inward extending flange 84, such that one of the outer edges of the mirror 74 may be in contact with a surface or shoulder located where the inner extending flange 84 transitions from a thinner portion to a thicker portion. This shoulder defined by the transition from the thinner portion to the thicker portion of the inner extending flange 84 generally may be a flat surface to which the vanity mirror 74 may abut or contact on one edge thereof while the other edges of the vanity mirror abut with or contact the side walls of the vanity frame 72. It should be noted that other securing mechanisms such as tape, glue, epoxy, locking fingers, springs or other locking surfaces, etc., may also be used to secure the vanity mirror 74 within the vanity frame 72 at a predetermined position such that the vanity mirror 74 is visible through the orifice 82 arranged through the vanity frame 72. Springs and other surfaces may also be used to secure the vanity mirror 74 within the vanity frame 72. Therefore, a bottom surface of the vanity mirror 74 may engage with or contact a portion of the inward extending flange 84 of the vanity frame 72 and in particular, the portion of the inward extending flange 84 directly adjacent to the orifice 82 arranged in the vanity frame 72. Arranged directly above the vanity mirror 74 is the sliding door 40 as described above. Hence, when the sliding door 40 is in the closed position, the vanity mirror 74 is hidden from view of the user by the vanity door 40, which is arranged directly above the vanity mirror 74. When the user grabs the handle 88 arranged on one end of the vanity door 40 and slides the vanity door 40 towards the solid portion of the vanity frame 72 the vanity mirror 74 may come into view for the user as it is arranged directly adjacent to and beneath the vanity door 40. The vanity 36 also includes a bezel 90 that is secured and arranged along the outer edge of the orifice 82 of the vanity frame 72. It should be noted that a plurality of locking fingers may extend from a bottom surface of the bezel 90 and interact with predetermined surfaces of the vanity frame 72 arranged at the outer circumference of the orifice 82. It should be noted that any other connecting methodology to secure the bezel 90 to the top surface or any other surface of the orifice 82 of the vanity frame 72 may be used including but not limited to an interference fit or any known connecting methodology both mechanical and chemical in nature. Generally, the bezel 90 has a rectangular shape with curved edges, however it should be noted that the edges may not be curved depending on the design of the orifice 82 into which the bezel 90 is arranged. The bezel 90 may have a first and second long member connected to a first and second short member at each end thereof thus forming a generally rectangular outline shape. This bezel 90 may be secured to the vanity frame 72 such that the door 40 stays secured with respect to the vanity frame orifice 82 and vanity mirror 74 when the vanity door 40 is in its closed position. The bezel 90 may have a generally U-shaped cross section when viewed along any of the legs which form the generally rectangular outer shape. It is also contemplated to use a press lit to secure the vanity bezel 90 within the top portion of the orifice 82 of the vanity frame 72. It should be noted that the door handle 88 is generally arranged a predetermined distance from an end of the vanity door 40 in order to allow for the vanity door 40 to completely cover and hide the mirror 74 when the vanity door 40 is in a closed position or the vanity door handle 88 may be arranged anywhere on the outer surface of the vanity door 40 and in any other known shape other than that as described herein and shown in the drawings. A bottom surface of the bezel 90 contacts an outer surface of the vanity door 40 when the vanity door 40 is in a closed position and during sliding of the vanity door 40 into its open position. This may allow for the vanity door 40 to be secured within the vanity frame 72 without the possibility of the vanity door 40 being dislodged when the vanity door 40 is in its closed position.

Another embodiment of the thin visor 20 according to the present invention generally uses the vanity 36 as described above except that the vanity 36 includes a pair of tracks 92 directly molded into an inner surface of one of the vanity half shells 22,24. The vanity door 40 is slidingly arranged within the pair of tracks 92 which are molded directly in the inside surface of the vanity half shell 22,24. This may or may not allow for the vanity frame 72 to be only arranged directly over a pocket 76 arranged in a predetermined portion of the visor half shell outer surface. Hence, the pocket 76 in the second embodiment may generally have a rectangular shape, however at one end of the pocket 76 may be an open slot 94 which allows for the visor door 40 to be slidingly arranged within the pair of tracks 92 arranged along a flange or wall 96 extending from an inside surface of one of the vanity half shells 22,24. The flange 96 that extends from the inner surface of the vanity half shell 22,24 also may have a plurality of ribs extending in any predetermined shape and direction arranged between the inner surfaces of the flange 96 to provide for a robust visor body and for the pair of tracks 92 in which the visor sliding door 40 may be slidingly arranged when in its open position. These ribs 98 generally may form a support system for the flange 96 extending from an inside surface of one of the visor half shells 22,24. In one contemplated embodiment a plurality of triangular shapes and quadrangle shapes may be defined by the plurality of ribs 98 being placed at predetermined angles with respect to one another from an inside surface of the vanity visor half shell 22,24. Hence, in operation, the sliding door 40 works the same as the embodiment described above, except the vanity visor half shell 22,24 has a smaller pocket 76 arranged therein, wherein the pocket generally mimics that of the shape of the mirror 74 arranged within the vanity frame 72. It should be noted that in the second embodiment the vanity frame 72 may also be removed such that the inward extending flange supporting the mirror 74 is directly molded into the pocket 76 of one of the visor half shells 22,24 and the door 40 is slidingly arranged within the pair of tracks 92 arranged directly in the vanity visor half shell 22,24 through the slot 94 arranged at one end of the pocket of the visor vanity half shell 22,24 such that the door 40 is placed directly over the top of the mirror 74 after the mirror 74 is secured within the pocket 76 of the visor vanity half shell 22,24 without the use of a frame. A bezel 90 may be arranged at a top surface of the pocket 76 of the visor half shell 22,24 such that it is connected to the outer surface of the visor vanity half shell 22,24 and engages a top portion of the door 40 such that the visor door 40 is secured within the pocket 76 of the visor vanity half shell 22,24 when the door 40 is in its closed position covering the mirror 74 from view by the user. Hence, the use of the pocket 76 to perform some of the functions of the vanity frame 72 may reduce the use of components necessary to make the sliding vanity door 40 possible in another embodiment of the thin visor 20 according to the present invention. Therefore, the door 40 of the vanity 36 may slide through the orifice of the pocket 76 which is arranged along an entire edge thereof, into the preformed pair of tracks 92 arranged from an inside surface of one of the vanity half shells 22,24.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A visor for a vehicle, said visor comprising:
   a pivot rod;
   a first and second shell being engageable to form a visor body;
   a vanity secured to said visor body;
   a carrier positioned in said visor body and engaged with said pivot rod;
   a first electrical contact arranged on an end of said pivot rod;
   a second electrical contact arranged on said carrier; and
   a third electrical contact arranged on said carrier.

2. The visor of claim 1 wherein said second electrical contact is arranged at or near a first end of said carrier.

3. The visor of claim 1 wherein said third electrical contact is arranged at or near a second end of said carrier.

4. The visor of claim 1 wherein said end of said pivot rod having a reduced diameter.

5. The visor of claim 1 wherein said first electrical contact having a flange extending from one end thereof, said flange covering a predetermined sized arc on an outer circumferential surface of said pivot rod.

6. The visor of claim 1 wherein said second and third electrical contact having a generally rectangular shape.

7. The visor of claim 6 wherein said second and third electrical contact having at least one set of locking fingers arranged at or near a midline thereof.

8. The visor of claim 7 wherein said carrier having a first flange extending from a first end thereof, said carrier having a second flange extending from a second end thereof.

9. The visor of claim 8 wherein said first and second flange having at least one post extending from a surface thereof.

10. The visor of claim 9 wherein said at least one post is arranged within and interacts with said set of locking fingers.

11. The visor of claim 5 wherein said third electrical contact engages said flange when the visor is rotated into a use position from a storage or home position, said engagement between said third electrical contact and said flange closes an electrical circuit between a light for use with the visor and a power source.

12. A visor for a vehicle, said visor comprising:
   a pivot rod;
   a first and second shell being engageable to form a visor body;
   a vanity arranged within a pocket of said first shell;
   said vanity comprising:
   a frame, said frame having an orifice arranged through generally one half of a top surface thereof;
   a door slidingly arranged within said frame;
   a mirror engaged with said frame and arranged underneath said door; and
   a bezel secured to said frame at the outer edge of said orifice, said bezel in contact with an outer surface of said door.

13. The vanity of claim 12 wherein said pocket having a locking orifice arranged therethrough.

14. The vanity of claim 13 wherein said frame having a locking finger extending from a surface thereof, said locking finger interengagable with said locking orifice to secure said frame to said first shell.

15. The vanity of claim 12 wherein said frame having a pair of channels arranged underneath a solid top surface portion thereof, said door slides in said pair of channels when said door is open to disclose said mirror of the visor to a user, said door when opened is partially arranged underneath said solid top surface, hidden from view of the user.

16. The vanity of claim 12 wherein said frame having a side wall, said frame having an inward extending flange, said inward extending flange is in direct contact with a bottom surface of said mirror and said pocket.

17. The vanity of claim 12 wherein said bezel having a generally U-shaped cross section.

18. A visor for a vehicle, a visor comprising:
   a pivot rod;
   a first and second shell being engageable to form a visor body;
   a vanity arranged within said visor body;
   said vanity comprising:
   a mirror arranged within a pocket of said first shell;
   a door slidably arranged within said frame, said door is arranged above said mirror and hides said mirror when closed;
   a bezel secured to said frame and in contact with a top surface of said door; and
   a pair of tracks extending from a surface of said first shell, said door is slidingly arranged in said pair of tracks.

19. The visor of claim 18 wherein said pocket having an orifice arranged along an entire edge thereof, said door slides through said orifice.

20. The visor of claim 18 wherein said door slides in a side to side motion, said door having a handle extending from a top surface thereof, said handle having a U-shaped cross section.

* * * * *